A. WAGNER.
BRAKE FOR CAR TRUCKS.
APPLICATION FILED MAY 11, 1914.
1,131,446.
Patented Mar. 9, 1915.
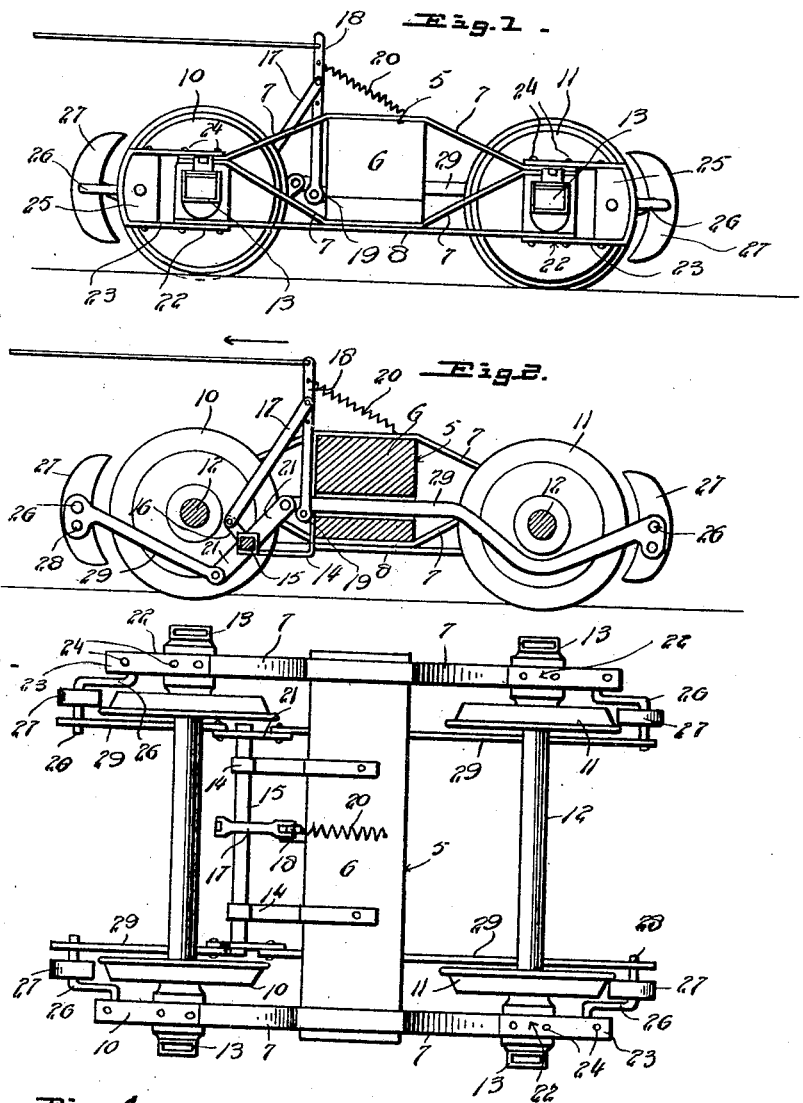
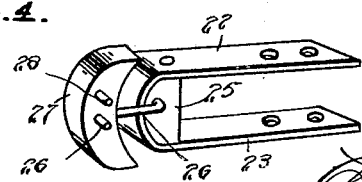

UNITED STATES PATENT OFFICE.

AUGUST WAGNER, OF CHESTER, ILLINOIS.

BRAKE FOR CAR-TRUCKS.

1,131,446.  Specification of Letters Patent.  Patented Mar. 9, 1915.

Application filed May 11, 1914. Serial No. 837,803.

*To all whom it may concern:*

Be it known that I, AUGUST WAGNER, a citizen of the United States, residing at Chester, in the county of Randolph, State of Illinois, have invented certain new and useful Improvements in Brakes for Car-Trucks; and I do hereby declare the following to be a full, clear, and exact description of the invention, such as will enable others skilled in the art to which it appertains to make and use the same.

This invention relates to vehicle brakes, particularly to that type of brake adapted for use on railroad and other cars and has for its object the provision of an improved brake mechanism which will be positive in operation and which may be easily and quickly set.

With these and other objects in view such as simplicity, cheapness of manufacture, ease of application, and durability in service together with the general improvement of the art, my invention consists in the novel construction and arrangement of parts as will be hereinafter described, claimed and illustrated in the accompanying drawings, in which:

Figure 1 is a side elevation of a car truck having my improved brake applied thereto, Fig. 2 is a longitudinal sectional view, Fig. 3 is a top plan view, and Fig. 4 is a perspective detail view of the shoe supporting block and shoe detached.

Referring more particularly to the drawing, the numeral 5 designates a truck as a whole which comprises the usual bolster 6 having a frame connected therewith, the frame being indicated by the numerals 7 and 8 and carrying the usual axle-boxes 13 within which are journaled axles 12 carrying wheels 10 and 11.

Revolubly mounted upon brackets 14 carried by the main bar 6 is a rock shaft 15 provided intermediate its ends with a rocker arm 16 which has connected therewith a link 17 extending upwardly and connected with a vertical lever 18 which is pivoted as at 19 upon the main bar 6. The vertical lever 18 is normally held in its inoperative position as shown, by a coil spring 20 secured to it and to the main bar 6. Upon its ends the rock shaft 15 is provided with oppositely extending arms 21 for a purpose to be described.

As I desire to actuate brakes used engaging the outer faces of the wheels 10 and 11 at the extreme ends of the truck 5, I provide extensions 22 adapted to be secured at the ends of the truck for carrying brake shoes to be described. Each of the extensions 22 comprises a U-shaped bar 23 which has its ends straddling the upper and lower faces of the arch bars 7 to which it is bolted or otherwise secured as at 24. Within the U-shaped bar is secured a block 25 provided with a journal bearing for the reception of a crank arm 26 adapted to carry at its other end a brake shoe 27. Each of the brake shoes 27 is provided upon its inner face with a stud 28. The brake shoes 27 are connected with the arms 21 by means of links 29. It will be observed that the links 29 are connected with the brake shoes 27 at two points, namely the studs 28 and the inner ends of the cranks 26.

The parts being in their inoperative positions as shown in the drawings, in order to set the brakes, it is necessary to exert a pull upon the vertical lever 18 in the direction of the arrow, whereupon by virtue of the link 17 and rocker arm 16, the rock-shaft 15 will be partially rotated carrying with it the arms 21 secured thereon. This movement of the arms 21 will pull upon the links 29 connecting the arms and the brake shoes 27 thereby rocking the brake shoes 27 downwardly into contact with the wheels 10 and 11 owing to the fact that they are carried by the cranks 26. When pressure upon the lever 18 is released the spring 20 will return the lever and consequently the rock shaft 15 to their original positions whereupon the brake shoes 27 will be thrown out of engagement with the wheels. The usual brake rod upon the car is to be connected with the lever 18 for actuating the device.

An important feature of this invention is the mounting of the brake shoes 27 and their connections with the operating means. In view of the fact that the links 29 are connected with the brake shoes 27 at two points, it will be seen that when the links 29 pull upon the brake shoes, the shoes 27 will be swung upon the cranks 26 but yet will be held always in the same relation to the links 39 thereby causing the shoes to contact along their entire inner faces with the wheels and preventing them from tilting and consequently grinding on the treads of the wheels.

Assuming that the truck 5 is traveling to the right when the lever 18 is actuated to set the brakes, the brake shoes 27 engaging the wheels 11 will be forced downwardly still more by the drag of the wheels upon them as will be readily understood. When the truck is traveling in the opposite direction the shoes engaging the wheels 10 will be further depressed in the same manner thereby causing the brakes to be to a certain extent self-operating after being set.

It will be readily understood that if the device is to be operated by compressed air instead of by manual means, the piston of the cylinder would be connected with the lever 18 by means of a pitman. (Not shown.)

From the foregoing it will be seen that I have thus provided an improved brake mechanism for the trucks of railroad or other cars and which will be simple and positive in operation and unlikely to become out of order.

It will be readily understood that various changes in the form, construction and arrangement of parts may be resorted to without departing from the spirit of the invention or limiting the scope of the subjoined claim.

What is claimed is:

In combination with a car truck, a brake mechanism comprising a rock shaft operable by the brake setting rod of the car, oppositely extending arms on said rock shaft, extension blocks secured upon the ends of said trucks, cranks journaled through said blocks adjacent the outer edges of the truck wheels, brake shoes revolubly mounted on said cranks and links rigidly connected with said brake shoes and pivotally connected with said arms.

In testimony whereof, I affix my signature, in the presence of two witnesses.

AUGUST WAGNER.

Witnesses:
 BENJ. F. DAVIS,
 WM. H. BOHNSOCK, Jr.

Copies of this patent may be obtained for five cents each, by addressing the "Commissioner of Patents, Washington, D. C."